United States Patent
Anantharaju

(10) Patent No.: US 10,255,089 B2
(45) Date of Patent: Apr. 9, 2019

(54) SELF-DELETING VIRTUAL MACHINES

(75) Inventor: Girish Anantharaju, San Jose, CA (US)

(73) Assignee: CA, Inc., New York, NY (US)

( * ) Notice: Subject to any disclaimer, the term of this patent is extended or adjusted under 35 U.S.C. 154(b) by 561 days.

(21) Appl. No.: 13/562,382

(22) Filed: Jul. 31, 2012

(65) Prior Publication Data

US 2014/0040997 A1  Feb. 6, 2014

(51) Int. Cl.
| | |
|---|---|
| *G06F 9/455* | (2018.01) |
| *G06F 21/53* | (2013.01) |
| *G06F 21/57* | (2013.01) |
| *G06F 9/4401* | (2018.01) |

(52) U.S. Cl.
CPC .......... *G06F 9/45558* (2013.01); *G06F 21/53* (2013.01); *G06F 21/575* (2013.01); *G06F 9/4401* (2013.01); *G06F 2009/45562* (2013.01); *G06F 2009/45587* (2013.01); *G06F 2221/2143* (2013.01)

(58) Field of Classification Search
CPC ....... G06Q 20/32; G06F 21/34; H04L 9/0863; H04L 9/3228
See application file for complete search history.

(56) References Cited

U.S. PATENT DOCUMENTS

| | | | | |
|---|---|---|---|---|
| 7,055,038 B2* | 5/2006 | Porter | .................. | G06F 12/1441 348/E5.108 |
| 7,941,579 B2* | 5/2011 | Uno | ................................ | 710/62 |
| 8,037,314 B2* | 10/2011 | Wood et al. | .................... | 713/180 |
| 8,131,997 B2* | 3/2012 | Chang et al. | .................. | 713/159 |
| 8,196,190 B2* | 6/2012 | Muto | .................. | 726/6 |
| 8,234,641 B2* | 7/2012 | Fitzgerald et al. | ................ | 718/1 |
| 8,516,272 B2* | 8/2013 | Hofstee et al. | ................ | 713/191 |
| 8,601,544 B1* | 12/2013 | Robinson | .............. | H04L 63/101 726/3 |
| 2003/0056054 A1* | 3/2003 | Levy et al. | ......................... | 711/6 |
| 2007/0143827 A1* | 6/2007 | Nicodemus et al. | .............. | 726/2 |
| 2008/0320583 A1* | 12/2008 | Sharma et al. | ................... | 726/12 |
| 2009/0144482 A1* | 6/2009 | Tankleff | ............................ | 711/6 |
| 2009/0319793 A1* | 12/2009 | Zic et al. | ....................... | 713/172 |
| 2010/0023996 A1* | 1/2010 | Sabin et al. | ....................... | 726/1 |
| 2010/0115291 A1* | 5/2010 | Buer | .............................. | 713/192 |
| 2010/0138828 A1* | 6/2010 | Hanquez | .............. | G06F 9/45533 718/1 |
| 2011/0032939 A1* | 2/2011 | Nozaki et al. | ................. | 370/392 |
| 2011/0081006 A1* | 4/2011 | Hao et al. | ................... | 379/88.13 |
| 2011/0107423 A1* | 5/2011 | Kolar Sunder et al. | ........ | 726/24 |
| 2011/0246786 A1* | 10/2011 | Laor et al. | ..................... | 713/189 |
| 2011/0258441 A1* | 10/2011 | Ashok et al. | .................. | 713/168 |
| 2011/0296488 A1* | 12/2011 | Dandekar et al. | ................. | 726/1 |
| 2011/0321166 A1* | 12/2011 | Capalik | ............... | H04L 63/1491 726/25 |
| 2012/0072655 A1* | 3/2012 | Li et al. | ......................... | 711/103 |
| 2012/0266231 A1* | 10/2012 | Spiers | ................. | H04L 63/0218 726/12 |
| 2012/0266252 A1* | 10/2012 | Spiers et al. | ..................... | 726/26 |

(Continued)

*Primary Examiner* — Yin Chen Shaw
*Assistant Examiner* — Carlos E Amorin

(57) ABSTRACT

Securing a virtual machine to be executed on a host machine is accomplished by authenticating, by the virtual machine during an initial boot routine, an identity of the host machine. If the identity does not match a predetermined value, then authenticating the identity of the host machine fails and data associated with the virtual machine is deleted.

20 Claims, 7 Drawing Sheets

(56) References Cited

U.S. PATENT DOCUMENTS

| | | | |
|---|---|---|---|
| 2013/0007465 A1* | 1/2013 | Movassaghi | 713/186 |
| 2013/0024936 A1* | 1/2013 | Jakobsson et al. | 726/23 |
| 2013/0061293 A1* | 3/2013 | Mao | 726/4 |
| 2013/0086394 A1* | 4/2013 | Shimmitsu | 713/193 |
| 2013/0139250 A1* | 5/2013 | Lo et al. | 726/19 |
| 2013/0145139 A1* | 6/2013 | Adam | G06F 21/40 713/2 |
| 2013/0145440 A1* | 6/2013 | Adam et al. | 726/5 |
| 2013/0159704 A1* | 6/2013 | Chandrasekaran | 713/156 |
| 2013/0212386 A1* | 8/2013 | Rastogi et al. | 713/168 |
| 2013/0227699 A1* | 8/2013 | Barak et al. | 726/26 |
| 2013/0305348 A1* | 11/2013 | Silverstone | G06F 21/445 726/16 |

\* cited by examiner

SELF-DELETING VIRTUAL MACHINES

BACKGROUND

The present disclosure relates to data security, and more specifically, to data security of virtual machines.

Cloud computing is a method of delivering computing resources as a service rather than a product. Hardware resources, software and information are provided to client computers as a service over a network. In this effort, a cloud vendor provides and maintains a hardware and software infrastructure on which an enterprise can deploy virtual machines. The cloud vendor may charge for the services provided to the enterprise based on an amount of resources (e.g., disk space, network bandwidth, processor utilization, etc.) that the virtual machines of an enterprise consume.

A virtual machine is a software implementation of a machine that executes programs and applications just like a physical machine. Sometimes referred to as a "system virtual machine", the virtual machine provides a complete system platform that supports execution of an operating system and any installed application software. Typically, an enterprise constructs a virtual machine by combining an operating system, application software, and the underlying data into a software package that can be executed within an application environment controlled by a hypervisor.

In practice, the cloud vendor provides a server, or other similar computer platform, as a host machine on which a hypervisor is executing. The hypervisor can be thought of as the communications pathway between the virtual machine and the underlying hardware of the host machine. Within the execution environment of the hypervisor, the virtual machine behaves as if it was a physical machine. The virtual machine can be "powered-on" and then boot up from a virtualized hard drive to load the operating system which can then provide access to application software and any underlying data and files.

A user at the enterprise uses a web browser, or other client interface software, to communicate with the hypervisor on the host machine. From the information provided by the hypervisor to the client interface, the user can see which virtual machines are available and select one for execution. Once a virtual machine begins execution, the web browser interface for the user mimics a physical monitor screen as if the user was using the actual physical hardware that is virtualized by the virtual machine.

Thus, a virtual machine can typically be executed on a number of different hardware platforms or host machines as long as an appropriate hypervisor is present that allows communications between a user and the virtual machine.

BRIEF SUMMARY

According to one aspect of the present disclosure, a method of securing a virtual machine to be executed on a host machine includes authenticating, by the virtual machine, an identity of the host machine utilizing an initial boot routine of the virtual machine, and deleting data associated with the virtual machine, if the authentication of the host machine identity fails.

According to another aspect of the disclosure, a secure virtual machine includes an initial boot routine configured to authenticate an identity of a host machine and, furthermore, a security portion of the initial boot routine is configured to delete data associated with the secure virtual machine, if the identity does not match a predetermined value.

According to yet another aspect of the disclosure, a computer program product for securing a virtual machine to be executed on a host machine includes a computer readable storage medium having computer readable program code embodied therewith. This computer readable program code includes computer readable program code configured to authenticate an identity of the host machine utilizing an initial boot routine of the virtual machine, and computer readable program code configured to delete data associated with the virtual machine, if the identity does not match a predetermined value.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
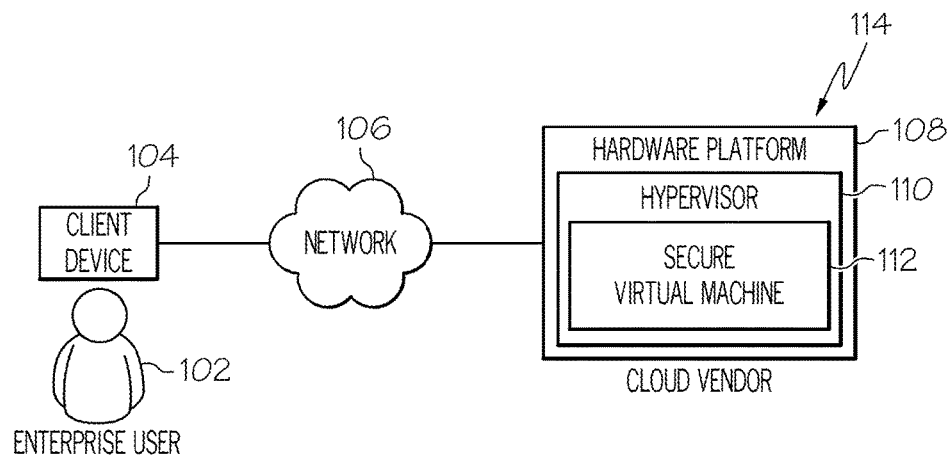
FIG. 1 illustrates an example computing environment in which a secure virtual machine can be deployed in accordance with the principles of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring to FIG. 1, a computing environment for deploying a secure virtual machine, in accordance with the principles of this disclosure, is depicted. A cloud vendor 114 provides a hardware platform 108 from which computing services can be accessed by an enterprise user 102. The enterprise user 102 may utilize a client device 104 to connect to the hardware platform 108 through a network 106. For example, the client device 104 may be a desktop computer, a laptop computer, a smart phone or another type of computing device. The client device 104 will also include an interface application, for example a web browser, which is configured to communicate with software operating on the hardware platform 108. On the hardware platform 108 one or more hypervisors 110 may be executing to provide an interface between a secure virtual machine 112 and a client device 104 of an enterprise user 102. The hypervisor 110 also provides an interface between the secure virtual machine 112 and the underlying operating system and hardware of the hardware platform 108.

The secure virtual machine 112 executes within the environment of the hypervisor 110 and behaves like a physical machine that receives input (e.g., mouse, keyboard, etc.) from the client device 104 and provides output (e.g., display screen, etc.) to the client device 104. In this way, the user interface of the client device 104 mimics the behavior as if the enterprise user 102 was directly operating the physical machine that is virtualized by the secure virtual machine 112.

Figure 2:
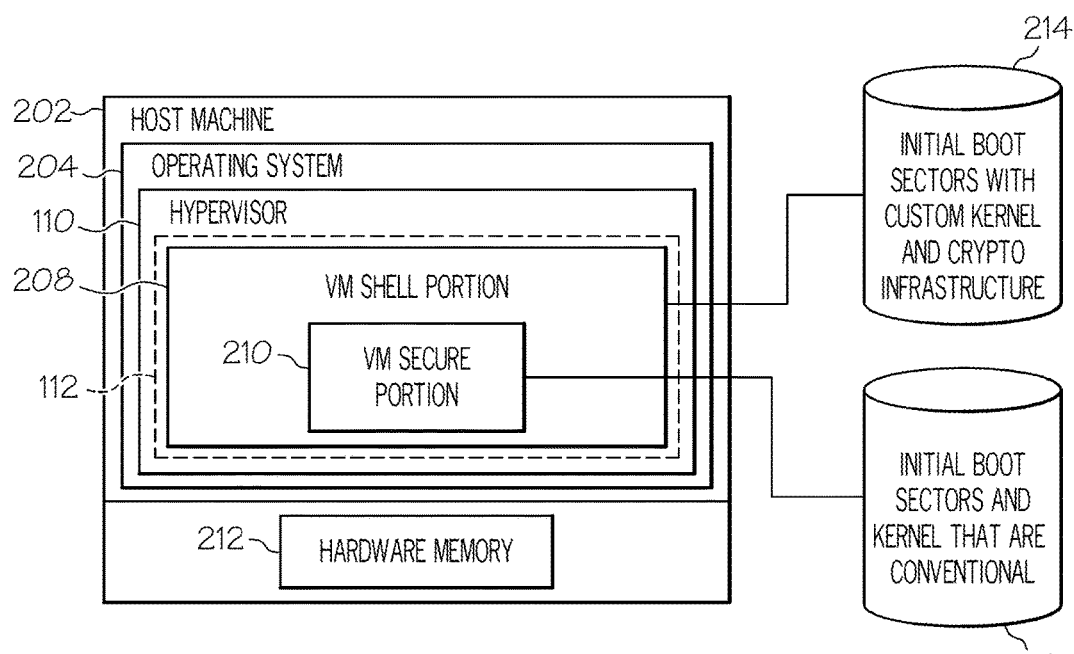
FIG. 2 illustrates a detailed view of a host machine on which a secure virtual machine can be deployed in accordance with the principles of the present disclosure.

FIG. 2 illustrates a detailed view of a host machine on which a secure virtual machine can be deployed in accordance with the principles of the present disclosure. In FIG. 1, the hardware platform 108 may be implemented in various ways with different configurations of servers, disk drives, network devices, and operating systems. In FIG. 2, one example configuration is shown in which a host machine 202 provides the hardware infrastructure for an operating system 204 (e.g., Windows, Mac OS X, Linux, etc.). Within the operating system 204, a hypervisor 110 can operate to provide the virtual environment in which one or more secure virtual machines 112 can execute. As previously mentioned, the secure virtual machine includes an operating system, application software, and underlying data and files that are organized on a virtualized disk drive. Within the virtual environment provided by the hypervisor 110, the secure virtual machine 112 boots up from the virtualized hard drive as if it was a physical machine with a physical hard drive.

In accordance with the principles of the present disclosure, the secure virtual machine (VM) 112 includes two nested portions which, in FIG. 2, are referred to as the virtual machine (VM) shell portion 208 and the virtual machine (VM) secure portion 210. As described in more detail below, when the secure virtual machine 112 is turned on, the VM shell portion 208 begins by accessing initial boot sectors of its virtualized hard drive 214 to perform an initial boot routine. The initial boot routine of the virtualized hard drive 214 can include a custom kernel that provides security or cryptographic functions. Depending on the outcome of these security or cryptographic functions, the booting of the VM shell 208 may be followed by the booting of the VM secure portion 210. In the VM secure portion 210, a subsequent boot routine accesses the initial boot sectors of a virtualized hard drive 216 of the VM secure portion 210. This subsequent boot routine includes a typical kernel that boots up to provide the operating system and application software of the VM secure portion 210.

The host machine 202 may also include a programmable hardware memory (212) (e.g., FPGA, EEPROM, etc.) that includes second data accessible by the cryptographic or security functions of the custom kernel. As explained below with reference to FIGS. 3A and 3B, the second data in the programmable memory 212 may be utilized to authenticate an identity of the host machine 202 so that the secure virtual machine 112 will only execute on one or more predetermined, or pre-identified, host machines.

Figure 3A:
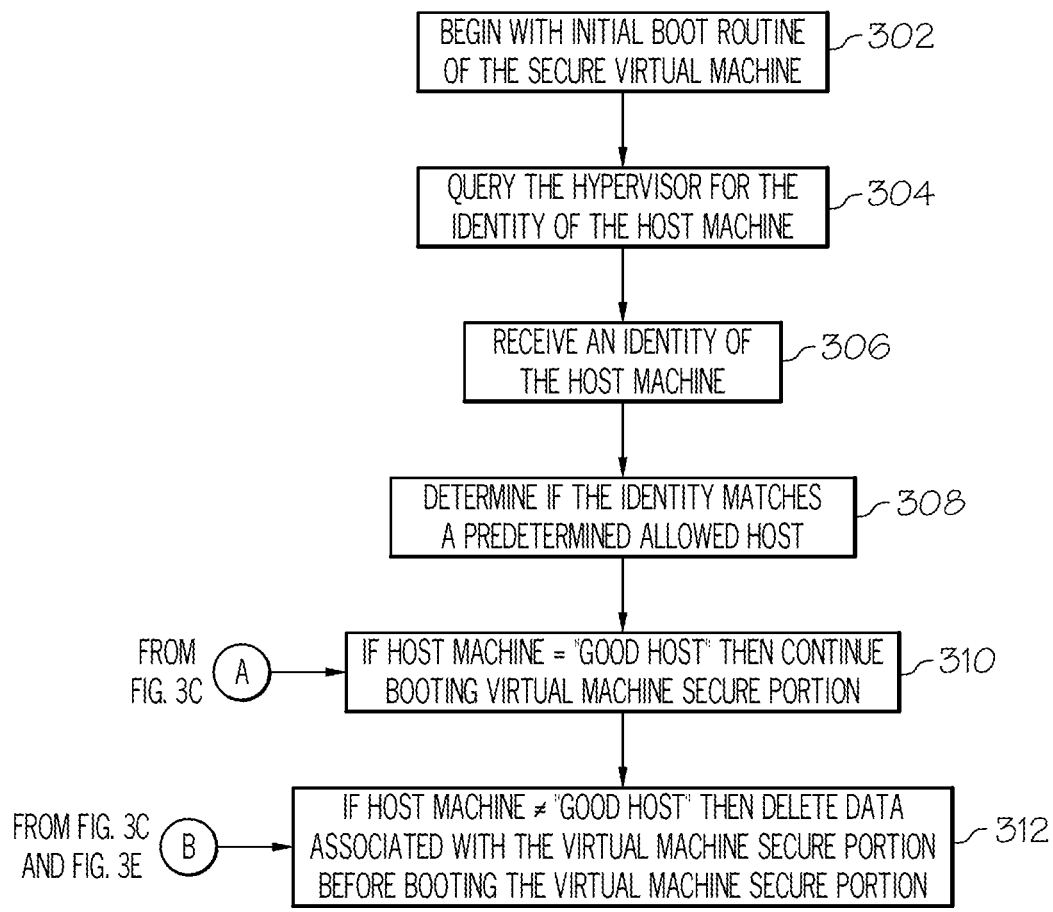
FIG. 3A depicts a flowchart of an example process for providing a secure virtual machine in accordance with the principles of this disclosure.

FIG. 3A depicts a flowchart of an example process for providing a secure virtual machine in accordance with the principles of this disclosure. In step 302, a client device 104 communicates with the hypervisor 110 to initiate the boot-up of the secure virtual machine 112. Accordingly, the custom kernel on the virtualized hard drive 214 begins execution. As part of the custom kernel, executable code is performed in step 304, that queries the hypervisor 110 to determine the identity of the host machine 202.

In step 306, the custom kernel continues execution by receiving a response that includes the identity of the host machine 202 on which the secure virtual machine 112 is presently running. As shown in FIG. 2, there may be a programmable hardware memory 212 that stores second data for determining the host machine identity. Thus, the hypervisor 110 may include functionality that receives a query from the custom kernel, forwards it to the programmable memory 212, receives a response back from the programmable memory 212 and then forwards that response to the custom kernel.

The custom kernel of the secure virtual machine 112 then, in step 308, determines if the identity of the host machine 202 matches the name of a predetermined allowed host. Because the enterprise is the entity that constructed the secure virtual machine 112, they can include in the custom kernel only those names of allowed host machines on which the enterprise wants a virtual machine to run. As described herein, a predetermined allowed host machine is referred to as having the name "GOOD HOST". Although this term is singular, one of ordinary skill will recognize that "GOOD HOST" may also include additional names such that a secure virtual machine 112 may be configured by the enterprise to be able to execute on more than one host machine 202.

If, in step 310, the custom kernel determines that the host machine 202 is a "GOOD HOST", then the custom kernel continues with a subsequent boot routine of the virtual machine secure portion 210. As a result, the virtual machine secure portion 210 becomes operable in the hypervisor 110 and provides application software and data to the client device 104 and enterprise user 102.

If, in step 312, the custom kernel determines that the host machine is not a "GOOD HOST", then the custom kernel performs executable code that deletes at least a portion of first data associated with the virtual machine secure portion 210.

The deletion of the first data, i.e., sensitive data, related to the virtual machine secure portion 210 can be a partial deletion or a full deletion. For example, the custom kernel, in step 312, can reformat the virtualized hard drive 216 of the virtual machine secure portion 210. This complete deletion will ensure that the sensitive data associated with the virtual machine secure portion 210 can only be accessed if the secure virtual machine 112 is executed on a "GOOD HOST". Alternatively, the custom kernel can include a list of file names or file locations where sensitive data and files are stored on the virtualized hard drive 216. If the custom kernel determines that the host machine 202 is not a "GOOD HOST", then the custom kernel, in step 312, can access the list of file names and delete all of those files. Once the sensitive files have been deleted, then the custom kernel can allow normal boot up of the virtual machine secure portion 210. One of ordinary skill will recognize that the custom kernel does not have to include all of the sensitive file names but, instead, could include a pointer to a file location on the virtualized hard drive 216. At that file location can be a file that lists all of the sensitive data that should be deleted. Also, this list of sensitive data can periodically be updated by an enterprise user 102 of the virtual machine secure portion 210, if desired. Thus, when the custom kernel is executing it can refer to the pointed-to file location and retrieve the names of all the files that should be deleted to prevent access to the sensitive data.

As a result of the process of FIG. 3A, a secure virtual machine can determine the identity of the host machine on which it is executing and decide whether or not the host machine is an allowed machine. If the host machine is not one of the allowed machines, then the secure virtual machine can delete all or a portion of sensitive data associated with the secure virtual machine. In this way, an unintended user cannot move the secure virtual machine to an unallowed host machine and gain access to the sensitive data which an enterprise associated with the secure virtual machine.

Within the process of FIG. 3A, the steps of querying for the host machine identity, receiving the machine host identity and determining whether or not it matches a "GOOD HOST" can be performed in a secure manner so that the enterprise can have confidence that a third party cannot circumvent the security measures provided by the secure virtual machine 112.

In particular, various methods and protocols are known for mutually authenticating the identities of two parties trying to initiate communication with one another. Both symmetrical and asymmetrical encryption protocols can be used without departing from the scope of the present disclosure. However, FIG. 3B-FIG. 3E provide two different examples of how the secure virtual machine 112 and the host machine 202 can securely and accurately share credentials so that there is some assurance that the communicating parties are who they identify themselves to be. Both examples happen to rely on a basic model of public key infrastructure (PKI) in which each party has a public key and a private key to perform decrypting and encrypting functions. The public key may, for example, comprise a "key value" provided by some designated authority as an encryption key that, combined with a private key, can be used to effectively encrypt messages, decrypt messages, and provide digital signatures. The public and private keys each have a respective "key size," or "key length," that is measured in the number of bits used to represent the "key value" (e.g., a 128-bit key is 128 bits in length).

Figure 3B:
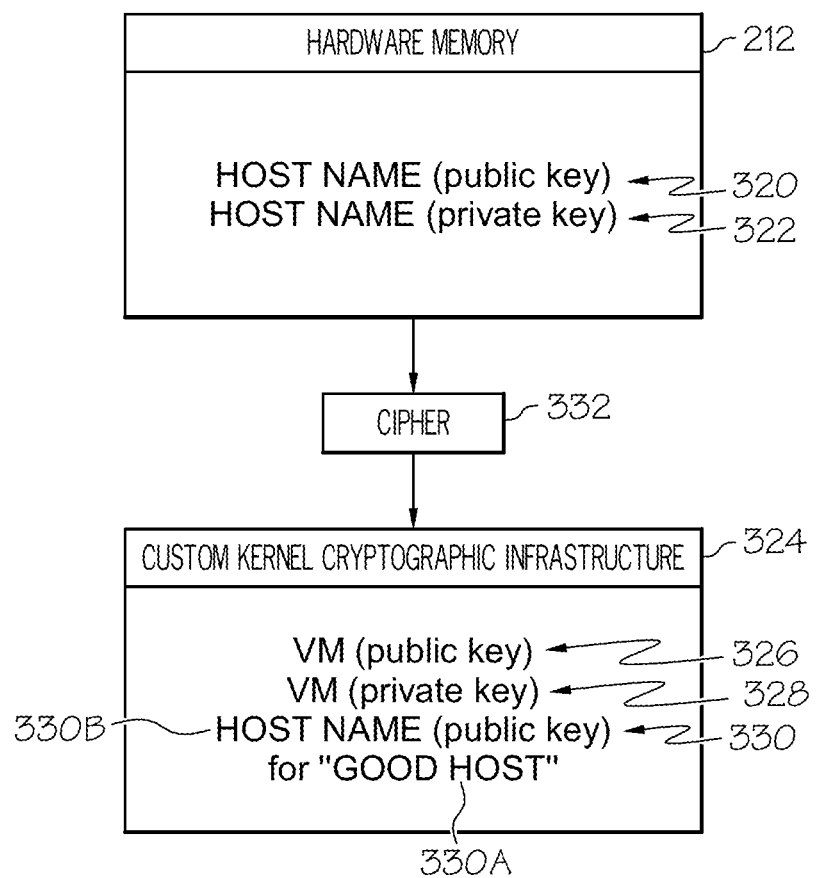
FIG. 3B illustrates a public key infrastructure (PKI) environment in which secure virtual machines can be deployed in accordance with the principles of the present disclosure.

FIG. 3B illustrates a public key infrastructure (PKI) environment in which secure virtual machines can be deployed in accordance with the principles of the present disclosure. In the environment of FIG. 3B, the enterprise controls the generation and location of all the public and private keys. Thus, the enterprise generates a HOSTNAME (public key) 320 and a HOSTNAME (private key) 322 and controls placement of that second data within the programmable hardware memory 212 of the host machine 202. The enterprise also controls the generation and location of a VM (public key) 326 and a VM (private key) 328. Thus, the enterprise generates these two keys, 326 and 328, and places them within a cryptographic infrastructure 324 of the custom kernel on the virtualized hard drive 214. The cryptographic infrastructure 324 also includes data 330 about a "GOOD-HOST" including the name 330A of the entity "GOOD-HOST" and a HOSTNAME (public key) 330B of "GOOD HOST" which is placed there by the enterprise when constructing the secure virtual machine 112. In the illustrated embodiment, the host machine 202 is presumed to be the GOODHOST. Hence, the HOSTNAME (public key) 320 of the host machine 202 is the same as the HOSTNAME (public key) 330B of GOOD HOST.

Figure 3C:
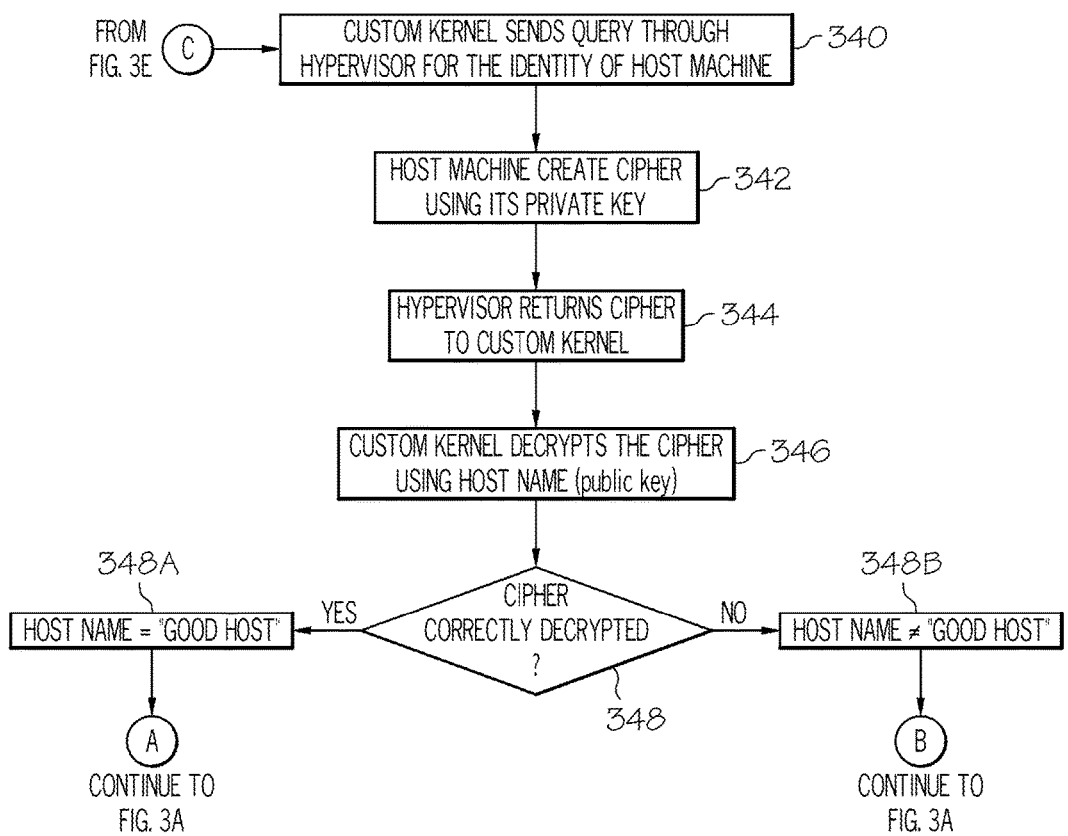
FIG. 3C depicts a flowchart of an example process for providing secure virtual machines within the PKI environment of FIG. 3B.

FIG. 3C depicts a flowchart of an example process for providing secure virtual machines within the PKI environment of FIG. 3B. Within this PKI environment, the custom kernel, in step 340, sends a request through the hypervisor 110 for the identity of the host machine 202. In particular, the custom kernel can request that the host machine 202 create a cipher (e.g., enciphered text) using the HOSTNAME (private key) 322. As shown in FIG. 3B and noted above, the data 330 about "GOOD HOST" within the custom kernel cryptographic infrastructure 324 includes the name 330A of the entity "GOOD HOST" and the public key 330B of that entity. Thus, the custom kernel cryptographic infrastructure 324 includes a predetermined value for the name 330A, or identity, of one or more host machines on which the secure virtual machine 112 is allowed to execute.

Next, in step 342, in response to the custom kernel's request, the host machine 202 creates a cipher 332 using its private key 322. The functionality to create the cipher 332 can be included within the hypervisor 110 or entirely within the programmable memory 212. If, for example, the hypervisor 110 is responsible for creating the cipher 332, then in response to the custom kernel's request, the hypervisor 110 can query the programmable memory 212 for the HOSTNAME (private key) 322 and then generate the cipher 332 which is then returned to the custom kernel, in step 344. Alternatively, in a more secure manner, the hypervisor 110 receives the request for a cipher from the custom kernel and requests the cipher from the programmable memory 212. Within the programmable memory 212, there is cryptographic executable code that receives the request, creates the encrypted cipher 332 and then returns that cipher 332 to the hypervisor 110 which, in turn, returns the cipher 332 to the custom kernel, in step 344.

In step 346, the custom kernel decrypts the cipher 332 using the public key 330B associated with "GOOD HOST". If, in step 348, the decrypted cipher matches what the custom kernel was expecting, then the custom kernel knows that it was encrypted with the private key of "GOOD HOST. For example, the text that is encrypted to create the cipher 332 can be any of a variety of different predetermined data upon which the host machine 202 and the cryptographic infrastructure 324 agree prior to the host machine 202 generating the cipher. Because the predetermined data is known to both the host machine 202 and the cryptographic infrastructure 324, the predetermined data may be used to identify the host machine 202 to the secure virtual machine 112. Referring to the keys of FIG. 3B, if the cipher 332 is properly decrypted by the custom kernel with the public key 330B of "GOOD HOST", then the custom kernel determines that the cipher was a properly encrypted version of the predetermined data using the private key of "GOOD HOST." Thus, the custom kernel can determine that the HOSTNAME (private key) 322 in the programmable hardware memory 212 is the private key of "GOOD HOST". As a result, the custom kernel can determine, in step 348A, that the identity of the host machine 202, as defined by the predetermined data encrypted to create the cipher, on which it is executing does, in fact, match a predetermined value "GOOD HOST", wherein the predetermined value corresponds to the predetermined data stored in the cryptographic infrastructure 324. Based on this determination, the custom kernel then proceeds to a routine boot up (step 310 of FIG. 3A) if the custom kernel determines it is executing on "GOOD HOST" or starts deleting sensitive data (step 312, FIG. 3A) if the custom kernel determines, in step 348B, it is NOT executing on "GOOD HOST".

The text that is encrypted to create the cipher 332 can be any of a variety of different data upon which the host machine 202 and the cryptographic infrastructure 324 agree. For example, the cryptographic infrastructure 324 can include a 'codeword' that is sent with the request such that the executable code within the programmable hardware memory 212 receives the 'codeword' and encrypts it to create the cipher 332. Alternatively, the executable cryptographic code within the programmable hardware memory 212 can be configured to know that it should encrypt the HOSTNAME (public key) 320 when it receives a request for a cipher from the hypervisor 110. The HOSTNAME (public key) 320 may comprise an arbitrary value appropriate for a particular PKI being utilized. Also, instead of encrypting the entire HOSTNAME (public key) 320, executable cryptographic code in the programmable hardware memory 212 may first generate a hash (e.g., an MD5 hash) of the HOSTNAME (public key) 320 and encrypt that hash and send the encrypted hash as the cipher 332. In this instance, the custom kernel cryptographic infrastructure 324 would use the same hash algorithm (e.g., MD5) and generate its own hash of the HOSTNAME (public key) 320 for "GOOD HOST". The cryptographic infrastructure 324 would also decrypt the cipher 332 with the HOSTNAME (public key) 320 for "GOOD HOST". If the received and decrypted cipher comprising the hash of the HOSTNAME (public key) 320 matches its own internally generated hash, then the custom kernel cryptographic infrastructure 324 would determine that the cipher 332 was sent by "GOOD HOST".

In one variation, the custom kernel cryptographic infrastructure 324 can also share its VM (public key) 326 with the programmable hardware memory 212. Any messages sent by the custom kernel cryptographic infrastructure after that may be encrypted (or signed) with the VM (private key) 328. In this way, the programmable hardware memory 212 can decrypt any received messages that were encrypted using the VM (public key) 326. Only those messages which were encrypted with the VM (private key) 326 would properly decrypt and this allows the hardware programmable memory 212 to determine if a message it receives is actually from the secure virtual machine 112.

Figure 3D:
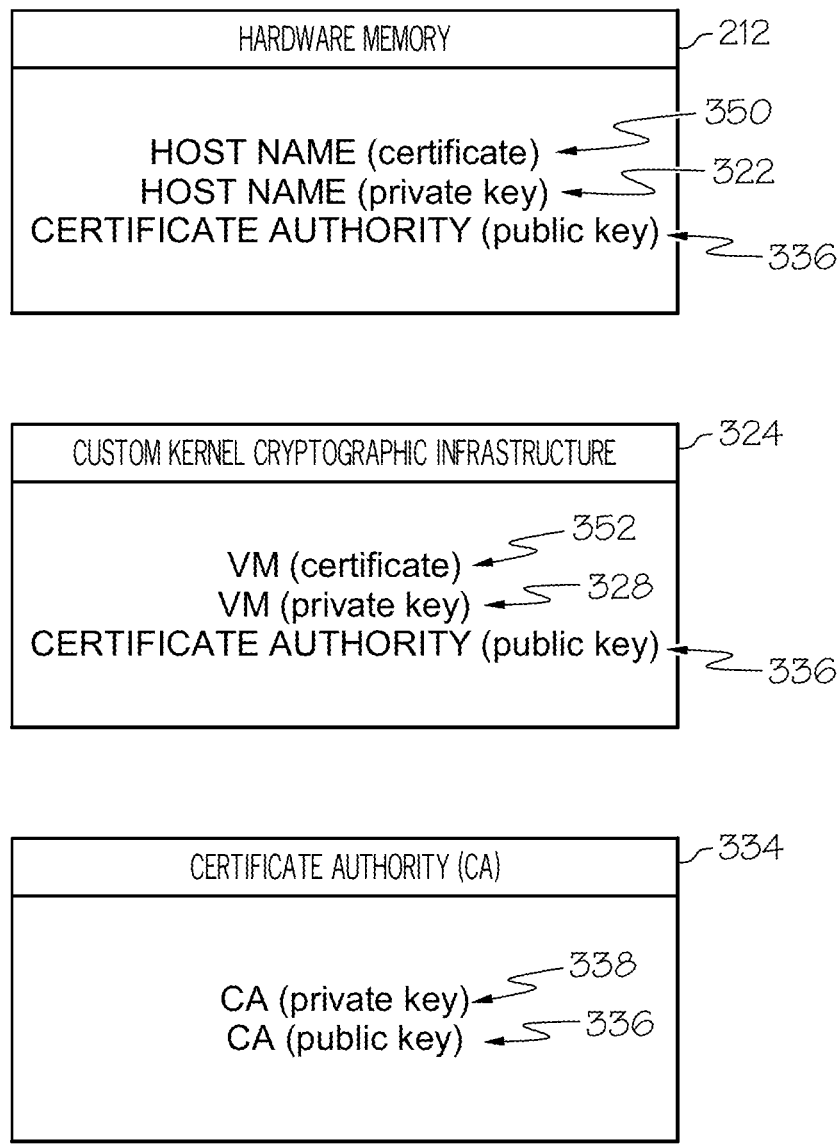
FIG. 3D illustrates a second PKI environment in which secure virtual machines can be deployed in accordance with the principles of the present disclosure.

FIG. 3D illustrates a second PKI environment in which secure virtual machines can be deployed in accordance with the principles of the present disclosure. In this PKI environment, the host machine 202 and the secure virtual machine 112 rely on a trusted certificate authority to generate certificates associated with the public and private keys of the two parties. The certificate authority (CA) 334 is a trusted third party that has a well-established and known CA (public key) 336. The CA 334 creates certificates that different entities can rely upon to help authenticate themselves and other entities. One of ordinary skill will recognize that there are many different ways to create digital certificates and that the specific information included within different digital certificate formats may vary. In general, however, a certificate for an entity includes contents that identify the entity to another party and an encrypted signature of the contents that was generated using the CA (private key) 338.

When a first party in a communication channel receives a certificate from a second party in that channel, the second party can decrypt the signature of the certificate using the CA (public key) 336. If it properly decrypts, then the second party can know that the contents of the certificate were signed by the CA 334 and, thus, the certificate is an accurate version of the certificate that was issued by the CA 334 to the entity identified by the certificate, i.e., the first party in this example. One example of what data might be within the contents of a certificate is that the contents may include an entity's name (or identity) and the public key associated with that entity name. This particular example of what the contents of a certificate for the first party may include is helpful in two ways: first, any message received by the second party purportedly from the first party will only be decryptable with the public key in the certificate if the message was first encrypted with the same entity's, i.e., first party's private key; and second, any message which the second party encrypts with the public key in the certificate can only be decrypted with that same entity's, i.e., first party's private key.

In FIG. 3D, the programmable hardware memory 212 includes its HOSTNAME (certificate) 350, its HOSTNAME (private key) 322 and the CA (public key) 336. This data can be generated by the cloud vendor 114 without necessarily receiving input from the enterprise. The HOSTNAME (certificate) 350 can include the HOSTNAME (public key) 320. The custom kernel cryptographic infrastructure 324 includes the VM (certificate) 352, the VM (private key) 328, and the CA (public key) 336. The VM (certificate) 352 can include the VM (public key) 326. This data can be generated by the enterprise without input from the cloud vendor 114.

Figure 3E:
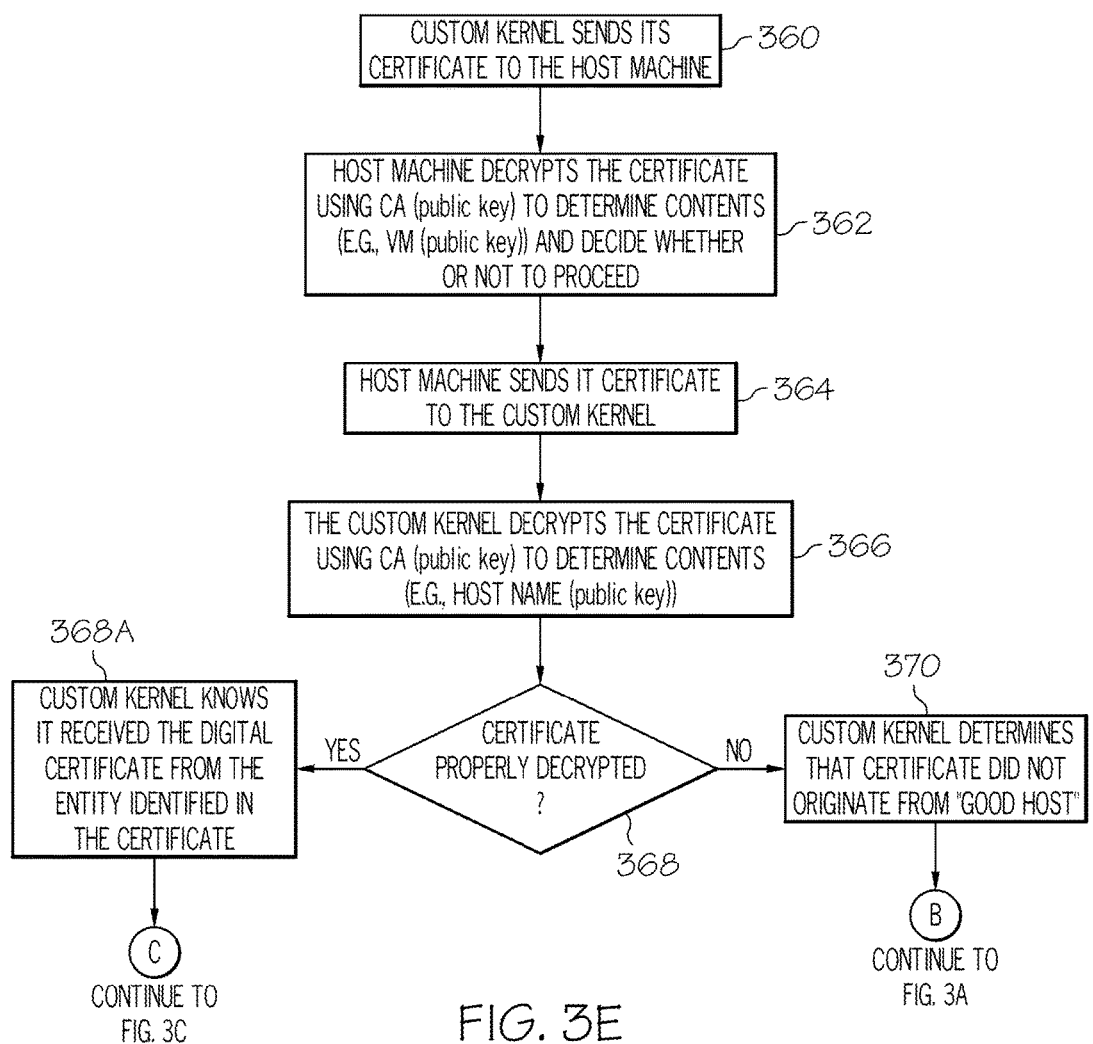
FIG. 3E depicts a flowchart of an example process for providing secure virtual machines within the PKI environment of FIG. 3D.

FIG. 3E depicts a flowchart of an example process for providing secure virtual machines within the PKI environment of FIG. 3D. In this environment, the host machine 202 and the secure virtual machine 112 first mutually authenticate themselves to one another before proceeding to the cipher exchange described in FIG. 3C. While the flowchart of FIG. 3E shows the secure virtual machine initiating the mutual authentication protocol, one of ordinary skill will recognize that the exchange of messages does not necessarily have to follow the specific order depicted in the flowchart.

Similar to the flowchart of FIG. 3C, the hypervisor 110 can be involved with passing messages between the programmable hardware memory 212 of the host machine 202 and the custom kernel cryptographic infrastructure 324. However, for clarity in the flowchart of FIG. 3E, only the actions of the principal communicators (i.e., the host machine 202 and the secure virtual machine 112) are depicted.

In step 360, the custom kernel cryptographic infrastructure 324 sends the VM (certificate) 352 to the host machine 202. Once the host machine 202 receives the VM (certificate) 352, the executable code in the programmable hardware memory 212 (or possibly in the hypervisor 110) decrypts the certificate with the CA (public key) 336. Because the programmable hardware memory 212 knows the format of the expected certificate contents, it can determine if the certificate received from the custom kernel properly decrypts using the CA (public key) 336. If the certificate does not properly decrypt, then the hypervisor can stop execution of the secure virtual machine 112 and stop the process of FIG. 3E. If, however, the certificate does properly decrypt, then the programmable hardware memory 212 can, in step 364, send its certificate, HOSTNAME (certificate) 350, to the custom kernel.

Once the custom kernel receives the HOSTNAME (certificate) 350, it can decrypt the certificate 350 with the CA (public key), in step 366, to determine its contents. For example, the custom kernel may decrypt the HOSTNAME (certificate) 350 to determine the HOSTNAME (public key) 320.

If the HOSTNAME (certificate) 350 properly decrypts in step 368, then the custom kernel can determine, in step 368A, that it received an unaltered copy of the digital certificate that the CA 334 issued to the entity that is identified by the contents of the certificate 350. The custom kernel can then proceed to step 340 of FIG. 3C to further determine if the host machine 202 that sent the HOSTNAME (certificate) 350 is "GOOD HOST".

If the HOSTNAME (certificate) 350 does not properly decrypt, in step 368, into an expected certificate format, then the custom kernel cryptographic infrastructure can determine, in step 368B, that the host machine 202 that sent the HOSTNAME (certificate) 350 was likely not "GOOD HOST". Deleting of sensitive data by the secure virtual machine 112 can then start by proceeding to step 312 of FIG. 3A.

As discussed before, a digital encryption of just a hash of a message contents rather than the entire message can be performed. For example, the CA 334 can create the HOSTNAME (certificate) by generating a hash of the contents of the certificate 350 (e.g., HOSTNAME (public key) 320) and then digitally signing that hash with its CA (private key) 338. To verify the HOSTNAME (certificate) 350, the custom kernel would generate its own hash of the certificate 350 contents, decrypt the signature in the certificate using the CA (public key) 336, and then compare the two hashes to see if the contents of the HOSTNAME (certificate) 350 had been altered.

Figure 4:
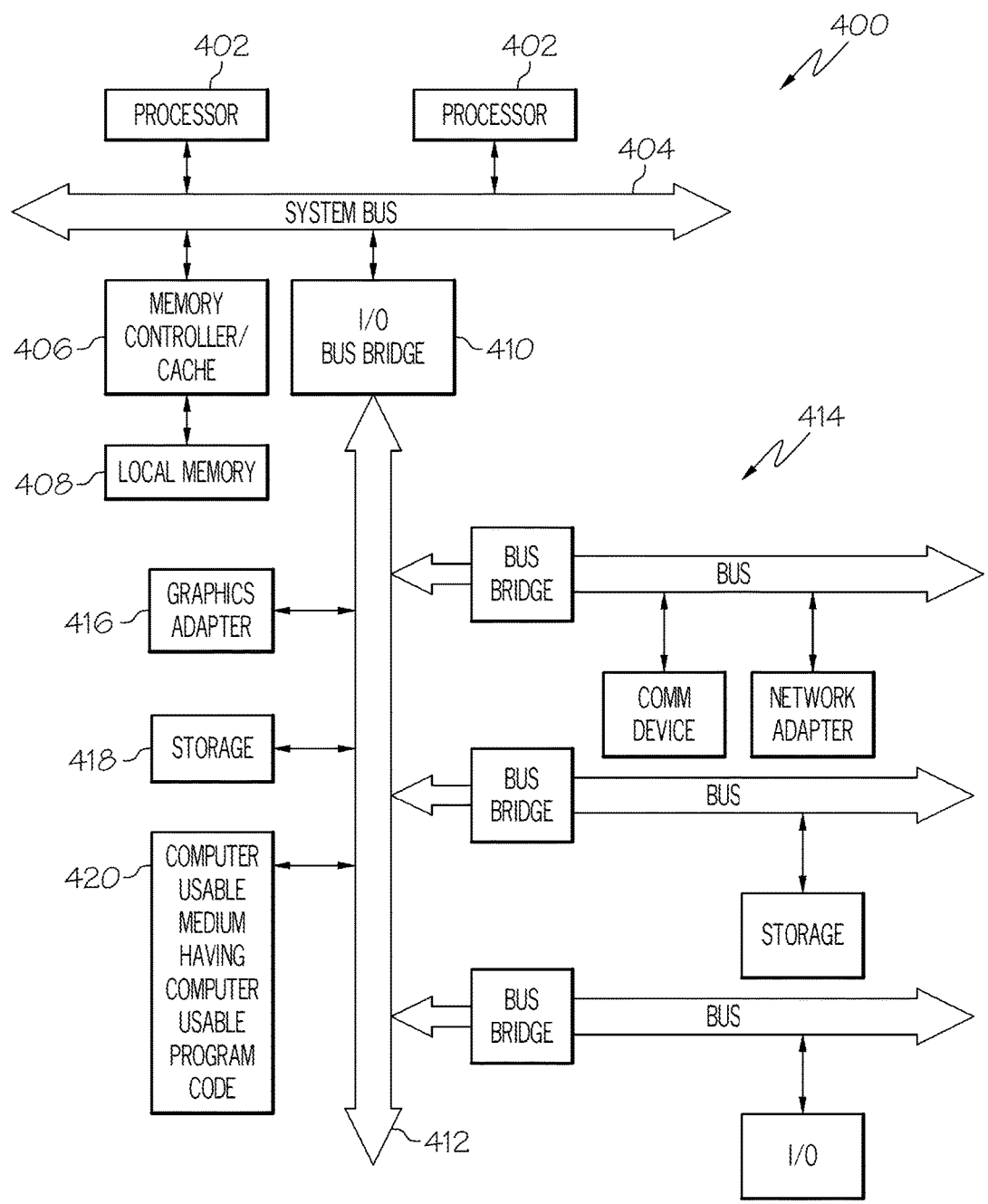
FIG. 4 is a block diagram of a data processing system in accordance with the principles of the present disclosure.

Referring to FIG. 4, a block diagram of a data processing system is depicted in accordance with the present disclosure. A data processing system 400, such as may be utilized to implement the hardware platform 108 or aspects thereof, e.g., as set out in greater detail in FIG. 1-FIG. 3E, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more busses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspect of any of the methods, computer program products and/or system components illustrated in FIG. 1-FIG. 3E.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method of securing a virtual machine to be executed on a physical host machine, comprising:
authenticating, by the virtual machine executing on the physical host machine, following boot up of an operating system executing on the physical host machine, an identity of the physical host machine utilizing an initial boot routine of the virtual machine;
wherein the virtual machine executes within a virtual environment provided by a hypervisor operating within the operating system executing on the physical host machine,
wherein the virtual machine comprises a shell portion and a secure portion, and
wherein the initial boot routine comprises the shell portion of the virtual machine accessing initial boot sectors of a first virtual hard drive associated with the shell portion;
querying, by the virtual machine executing on the physical host machine, the hypervisor for the identity of the physical host machine; and
deleting, by the virtual machine executing on the physical host machine, first data on a second virtual hard drive associated with the secure portion of the virtual machine, when authenticating the identity of the physical host machine fails.

2. The method of claim 1, comprising:
executing a subsequent boot routine of the virtual machine, when the identity of the physical host machine is successfully authenticated, wherein the subsequent boot routine comprises the secure portion of the virtual machine accessing initial boot sectors of the second virtual hard drive.

3. The method of claim 2, wherein executing the subsequent boot routine comprises:
executing an operating system kernel of the virtual machine.

4. The method of claim 1, wherein authenticating comprises:
receiving, by the virtual machine executing on the physical host machine, during the initial boot routine, second data corresponding to the identity of the physical host machine; and
comparing, by the virtual machine executing on the physical host machine, the second data corresponding to the identity with a predetermined value.

5. The method of claim 1, wherein authenticating the identity of the physical host machine comprises:
determining, by the virtual machine executing on the physical host machine, if the identity of the physical host machine matches a predetermined value.

6. The method of claim 1, wherein deleting the first data comprises:
identifying, during the initial boot routine, a list of files that represent the first data to be deleted;
mounting the second virtual hard drive of the virtual machine; and
deleting from the second virtual hard drive, files identified in the list of files.

7. The method of claim 6, further comprising:
executing an operating system kernel of the virtual machine in response to the deleting from the second virtual hard drive the files identified in the list of files.

8. The method of claim 1, further comprising authenticating the virtual machine to the physical host machine, said authenticating the virtual machine comprising:
sending from the virtual machine to the physical host machine, by the virtual machine executing on the physical host machine, a digital certificate that provides a virtual machine identity to the physical host machine.

9. A computer program product for securing a virtual machine to be executed on a physical host machine, comprising:

a non-transitory computer readable storage medium having computer readable program code embodied therewith, the computer readable program code comprising:
computer readable program code configured to authenticate an identity of the physical host machine utilizing an initial boot routine of the virtual machine following boot up of an operating system executing on the physical host machine;
wherein the virtual machine executes within a virtual environment provided by a hypervisor operating within the operating system executing on the physical host machine,
wherein the virtual machine comprises a shell portion and a secure portion, and
wherein the initial boot routine comprises the shell portion of the virtual machine accessing initial boot sectors of a first virtual hard drive associated with the shell portion;
computer readable program code configured to query the hypervisor for the identity of the physical host machine; and
computer readable program code configured to delete first data on a second virtual hard drive associated with the secure portion of the virtual machine, when the identity does not match a predetermined value.

10. The computer program product of claim 9, comprising:
computer readable program code configured to execute a subsequent boot routine of the virtual machine, when the identity matches the predetermined value, wherein the subsequent boot routine comprises the secure portion of the virtual machine accessing initial boot sectors of the second virtual hard drive.

11. The computer program product of claim 10, wherein the computer readable program code configured to execute the subsequent boot routine comprises:
computer readable program code configured to execute an operating system kernel of the virtual machine.

12. The computer program product of claim 9, wherein the computer readable program code configured to authenticate the identity of the physical host machine comprises:
computer readable program code configured to receive, by the virtual machine during the initial boot routine, second data corresponding to the identity of the physical host machine; and
computer readable program code configured to compare, by the virtual machine, the second data corresponding to the identity with the predetermined value.

13. The computer program product of claim 9, wherein the computer readable code configured to delete first data comprises:
computer readable program code configured to identify, during the initial boot routine, a list of files that represent the first data to be deleted;
computer readable program code configured to mount the second virtual hard drive of the virtual machine; and
computer readable program code configured to delete from the second virtual hard drive, files identified in the list of files.

14. The computer program product of claim 13, comprising:
computer readable program code configured to execute an operating system kernel of the virtual machine in response to deletion, from the second virtual hard drive, of the files identified in the list of files.

15. The computer program product of claim 9, comprising:
computer readable program code configured to authenticate the virtual machine to the physical host machine by sending from the virtual machine to the physical host machine, a digital certificate that provides a virtual machine identity to the physical host machine.

16. A system comprising:
a processor coupled with a memory;
said memory comprising code executable by the processor, said code configured, when executed, to implement a secure virtual machine;
the secure virtual machine comprising:
a shell portion and a secure portion;
an initial boot routine configured to authenticate an identity of a physical host machine following boot up of an operating system executing on the physical host machine;
wherein the secure virtual machine executes within a virtual environment provided by a hypervisor operating within operating system executing on the physical host machine; and
wherein the initial boot routine comprises the shell portion of the virtual machine accessing initial boot sectors of a first virtual hard drive associated with the shell portion;
a query portion of the initial boot routine configured to query the hypervisor for the identity of the physical host machine; and
a security portion of the initial boot routine configured to delete first data on a second virtual hard drive associated with the secure portion of the secure virtual machine, when the identity does not match a predetermined value.

17. The system of claim 16, wherein the secure virtual machine further comprises:
a subsequent boot routine configured to load data and an operating system of the secure virtual machine, when the identity matches the predetermined value, wherein the subsequent boot routine comprises the secure portion of the virtual machine accessing initial boot sectors of the second virtual hard drive.

18. The system of claim 16, wherein the initial boot routine is further configured to receive second data corresponding to the identity of the physical host machine and compare the second data with the predetermined value.

19. The system of claim 16, wherein the security portion of the initial boot routine is further configured to:
identify a list of files that represent the first data to be deleted;
mount the second virtual hard drive of the secure virtual machine;
delete from the second virtual hard drive, files identified in the list of files; and
initiate execution of an operating system kernel of the secure virtual machine in response to deleting from the second virtual hard drive the files identified in the list of files.

20. The system of claim 16, wherein the initial boot routine is further configured to send a digital certificate from the secure virtual machine to the physical host machine that provides a secure virtual machine identity to the physical host machine.

* * * * *